(12) United States Patent
Mine

(10) Patent No.: US 8,589,581 B2
(45) Date of Patent: Nov. 19, 2013

(54) WEATHER FORECAST DATA DISTRIBUTING SYSTEM AND METHOD

(75) Inventor: Masaya Mine, Kanagawa (JP)

(73) Assignee: NEC TOSHIBA Space Systems, Ltd., Kanagawa (JP)

( * ) Notice: Subject to any disclaimer, the term of this patent is extended or adjusted under 35 U.S.C. 154(b) by 1471 days.

(21) Appl. No.: 11/117,971

(22) Filed: Apr. 29, 2005

(65) Prior Publication Data

US 2005/0246103 A1   Nov. 3, 2005

(30) Foreign Application Priority Data

Apr. 30, 2004   (JP) .................................. 2004-135888

(51) Int. Cl.
G06F 15/16   (2006.01)
G01W 1/00   (2006.01)

(52) U.S. Cl.
USPC .............................. 709/232; 709/235; 702/3

(58) Field of Classification Search
USPC ................................ 709/235, 224, 232; 702/3
See application file for complete search history.

(56) References Cited

U.S. PATENT DOCUMENTS

| | | | |
|---|---|---|---|
| 4,731,866 A * | 3/1988 | Muratani et al. | 455/9 |
| 5,406,481 A * | 4/1995 | Shinozawa et al. | 702/3 |
| 5,675,081 A * | 10/1997 | Solheim et al. | 73/170.28 |
| 6,035,710 A * | 3/2000 | Hutchison et al. | 73/170.16 |
| 6,308,043 B1 * | 10/2001 | Solheim et al. | 455/63.1 |
| 6,421,528 B1 * | 7/2002 | Rosen et al. | 455/67.16 |
| 6,577,848 B1 * | 6/2003 | Gregg et al. | 455/13.2 |
| 2001/0049584 A1 * | 12/2001 | Jones et al. | 702/3 |
| 2002/0168974 A1 * | 11/2002 | Rosen et al. | 455/429 |

FOREIGN PATENT DOCUMENTS

| | | |
|---|---|---|
| DE | 40 41 915 A1 | 7/1999 |
| JP | 58200640 * | 5/1982 |
| JP | 05-334210 | 12/1993 |
| JP | 06-059055 | 3/1994 |
| JP | 07-183842 | 7/1995 |
| JP | 09-238111 | 9/1997 |
| JP | 2001-324576 | 11/2001 |

(Continued)

OTHER PUBLICATIONS

"New prediction method of Cloud attenuation" Salonen, E. Uppala,S. Electronics Letter $6^{th}$ 1991 vol. 27 No. 12 pp. 1106-1108.*

(Continued)

Primary Examiner — Brian J Gillis
(74) Attorney, Agent, or Firm — Scully Scott Murphy & Presser PC

(57) ABSTRACT

Broadcast signal c is transmitted from a broadcast transmitter 5 to an artificial satellite 1 for predetermined signal conversion, whereby broadcast signals $a_l$ to $a_n$ are transmitted to all of Japan. On-earth stations 6-1 to 6-$n$ are installed for weather forecast data. These on-earth stations receive the broadcast signals $a_l$ to $a_n$, respectively, transmitted from the artificial satellite 1, and transmit receiving state data $b_1$ to $b_n$, respectively, based on receiving level data to the artificial satellite 1. The receiving state signals are changed with variations of their radio wave attenuation according to whether it is cloudy, rainy, snowy, the cloud density, etc. The receiving state data are collectively sent back to a weather forecast center 9. Weather forecast data e obtained by analysis in the weather forecast center 9 is transmitted to the artificial satellite 1, which in turn sends weather forecast data f back to all of Japan.

7 Claims, 3 Drawing Sheets

(56) References Cited

FOREIGN PATENT DOCUMENTS

| | | |
|---|---|---|
| JP | 2001-333424 | 11/2001 |
| JP | 2002-319881 | 10/2002 |
| JP | 2003-219285 | 7/2003 |
| WO | WO 03/085860 A1 | 10/2003 |

OTHER PUBLICATIONS

"A Comprehensive/Selective MM-wave Satellite Downlink Experiment on Fade Dynamics" Vilar, E. Senin, S. Catalan, C. Waight, J. Vilar, J. Cardama, C. Romeu, J. Morell, S. Woodroffe, J. Lorente, J. Burgueno, A. IEEE Antennas and vol. 2, on pp. 98-101 vol. 2.*

Machine translation of (JP 2001-324576) Tsutomu et al. Nov. 22, 2001.*

Fukui Takehiko "Data Distribution System Utilizing Communication Satellite" JP2002-319881. Machine Translation.*

European Search Report dated Aug. 17, 2011 from related application EP 05009514.0-1246.

* cited by examiner

WEATHER FORECAST DATA DISTRIBUTING SYSTEM AND METHOD

BACKGROUND OF THE INVENTION

This application claims benefit of Japanese Patent Application No. 2004-135888 filed on Apr. 30, 2004, the contents of which are incorporated by the reference.

The present invention relates to weather forecast data distributing systems and methods capable of extracting weather data by using an artificial satellite and distributing weather forecast data obtained on the basis of the extracted data.

Weather forecast data distributing system by using an artificial satellite such as a typical one called "Himawari" in Japan, performs wide-area-wise weather forecast by mounting an observation sensor for observing rainy condition, cloudy condition, etc., in the artificial satellite and carrying out wide-area-wise observation.

When the system does weather forecasts in a plurality of areas, it sums up detected data from observation sensors each provided in each of a plurality of weather forecast centers each disposed in each weather forecast area, and it performs the weather forecasts.

For example, a weather forecast center measures the temperature in the pertinent area, and accumulates and manages the measured data as daily time-series data together with cloud quantity data at a pertinent time in a weather observation database. As the cloud quantity data, cloud distribution data observed by the artificial data is mainly used. As preliminary data a visual check is made as to whether cloud is found, and the result data is registered with reference to a manual.

Literature 1 (Japanese Patent Laid-Open 2001-324576) discloses condition forecast on the basis of a condition in a certain area and a past similar condition with the provision of a center A for forecasting a condition according to a wide-area observation network and a center B for performing wide-area condition forecasting and holding a condition database accumulated by local observations. Condition forecast results are obtained concerning a wide area including the area covered by the center B. On the basis of the similarity of the condition forecast results and past conditions in the area of the center B to one another, a past condition similar to the present condition is selected from the condition database. A present forecast value is generated from the selected past condition and subsequent condition changes.

For the weather forecast, one weather forecast image is generated from the above data. Alternatively, the weather radar images or weather satellite images are used as weather observation images. As a further alternative, use is made of image feature quantities obtained from visible images, infrared images or GPV data. As a yet further alternative, past data is retrieved as first stage candidate data, and separate kind past weather observation data of a pertinent time and data similar to the separate kind past weather observation data are selected from the retrieved past candidate data. Weather forecast data is thus generated from the selected past candidate data.

The prior art weather forecast data distributing system can perform wide-area-wise weather forecast by mounting an observation sensor for observing rain, cloud, etc., in an artificial satellite, typically one called "Himawari" for weather forecast and carrying out wide-area-wise observation by using this artificial satellite. However, the system has a drawback that it can not perform local weather forecast.

To cope with this drawback, it is necessary to install a plurality of on-earth sensors for local weather forecast in pertinent places, respectively. However, this means cost increase inclusive of management expenditures. Thus, it is extremely difficult to develop the wide area such as all areas in Japan.

SUMMARY OF THE INVENTION

An object of the present invention, accordingly, is to provide a weather forecast data distributing system capable of wide-area-wise weather forecast with a simple system arrangement and local weather forecast at low cost.

According to an aspect of the present invention, there is provided a weather forecast data distributing system comprising an artificial satellite for transmitting radio wave to be received in a plurality of on-earth stations provided on the earth; the plurality of on-earth stations transmitting data of the respective states of receiving the transmitted radio wave to the artificial satellite; and the artificial satellite executing analysis based on the received plurality of receiving state data and distributing weather forecast data thus obtained to the earth.

According to another aspect of the present invention, there is provided a weather forecast distributing system comprising an artificial satellite for transmitting radio wave to be received in a plurality of on-earth stations provided on the earth, the plurality of on-earth stations transmitting data of the respective states of receiving the transmitted radio wave to the artificial satellite; the artificial satellite transmitting the received plurality of receiving state data to a weather forecast center provided on the earth; the weather forecast center executing analysis based on the plurality of receiving state data and transmitting weather forecast data thus obtained to the artificial station; and the artificial satellite distributing the weather forecast data thus received to the earth.

According to other aspect of the present invention, there is provided a weather forecast data distributing system comprising an artificial satellite for transmitting radio wave to a plurality of on-earth stations provided on the earth: the plurality of on-earth stations transmitting data of the respective states of receiving the transmitted radio wave to the artificial satellite; the artificial satellite partly executing analysis based on the received plurality of receiving state data; the artificial satellite transmitting the received plurality of receiving state data to a weather forecast center installed on the earth; and the weather forecast center data of the analysis based on the plurality of receiving state data to the artificial satellite; the artificial satellite distributing weather forecast data obtained by taking the received analysis data into considerations to the earth.

The artificial satellite is a satellite arranged to receive signal for broadcast and/or communication transmitted from the earth and transmit a signal based on the received signal toward the earth. The weather forecast data is obtained by taking data other than the receiving state data into considerations. The data other than the receiving state data includes temperature data and/or relative humidity data in a pertinent area. The artificial satellite is located substantially in a still state with respect to the earth.

According to further aspect of the present invention, there is provided a weather forecast data distributing method comprising steps of: a step of receiving radio wave from an artificial satellite in a plurality of on-earth stations provided on the earth; a step of transmitting from the plurality of on-earth stations data of the respective states of receiving the transmitted radio wave to the artificial satellite; and a step of executing analysis based on the received plurality of receiving state data and distributing weather forecast data thus obtained to the earth by the artificial satellite.

According to still further aspect of the present invention, there is provided a weather forecast distributing method comprising steps of: a step of receiving radio wave from an artificial satellite in a plurality of on-earth stations provided on the earth; a step of transmitting from the plurality of on-earth stations data of the respective states of receiving the transmitted radio wave to the artificial satellite; a step of transmitting the received plurality of receiving state data from the artificial satellite to a weather forecast center provided on the earth; a step of executing analysis based on the plurality of receiving state data and transmitting weather forecast data thus obtained by the weather forecast center to the artificial station; and a step of distributing the weather forecast data thus received from the artificial satellite to the earth.

According to further aspect of the present invention, there is provided a weather forecast distributing method comprising steps of: a step of receiving radio wave from an artificial satellite in a plurality of on-earth stations provided on the earth; a step of transmitting from the plurality of on-earth stations data of the respective states of receiving the transmitted radio wave to the artificial satellite; a step of partly executing analysis based on the received plurality of receiving state data by the artificial satellite; a step of transmitting the received plurality of receiving state data from the artificial satellite to a weather forecast center installed on the earth; a step of data of transmitting analyzed data based on the plurality of receiving state data by the weather forecast center to the artificial satellite; and a step of distributing weather forecast data obtained by the artificial satellite by taking the received analysis data into considerations to the earth.

Other objects and features will be clarified from the following description with reference to attached drawings.

PREFERRED EMBODIMENTS OF THE INVENTION

Preferred embodiments of the present invention will now be described with reference to the drawings.

Figure 1:
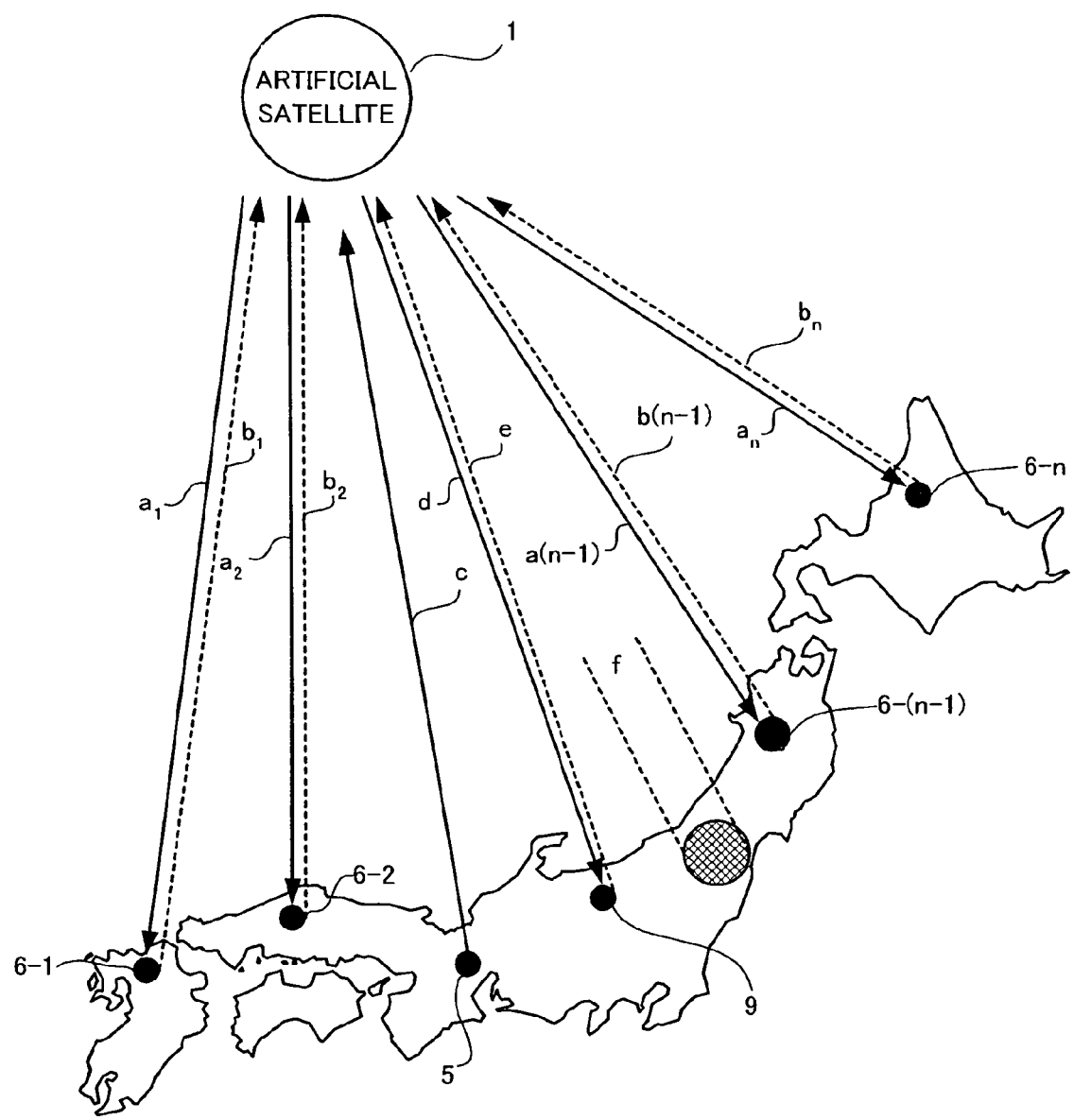
FIG. 1 is a view for describing the basic operation of an embodiment of the weather forecast data distributing system according to the present invention.
Figure 2:
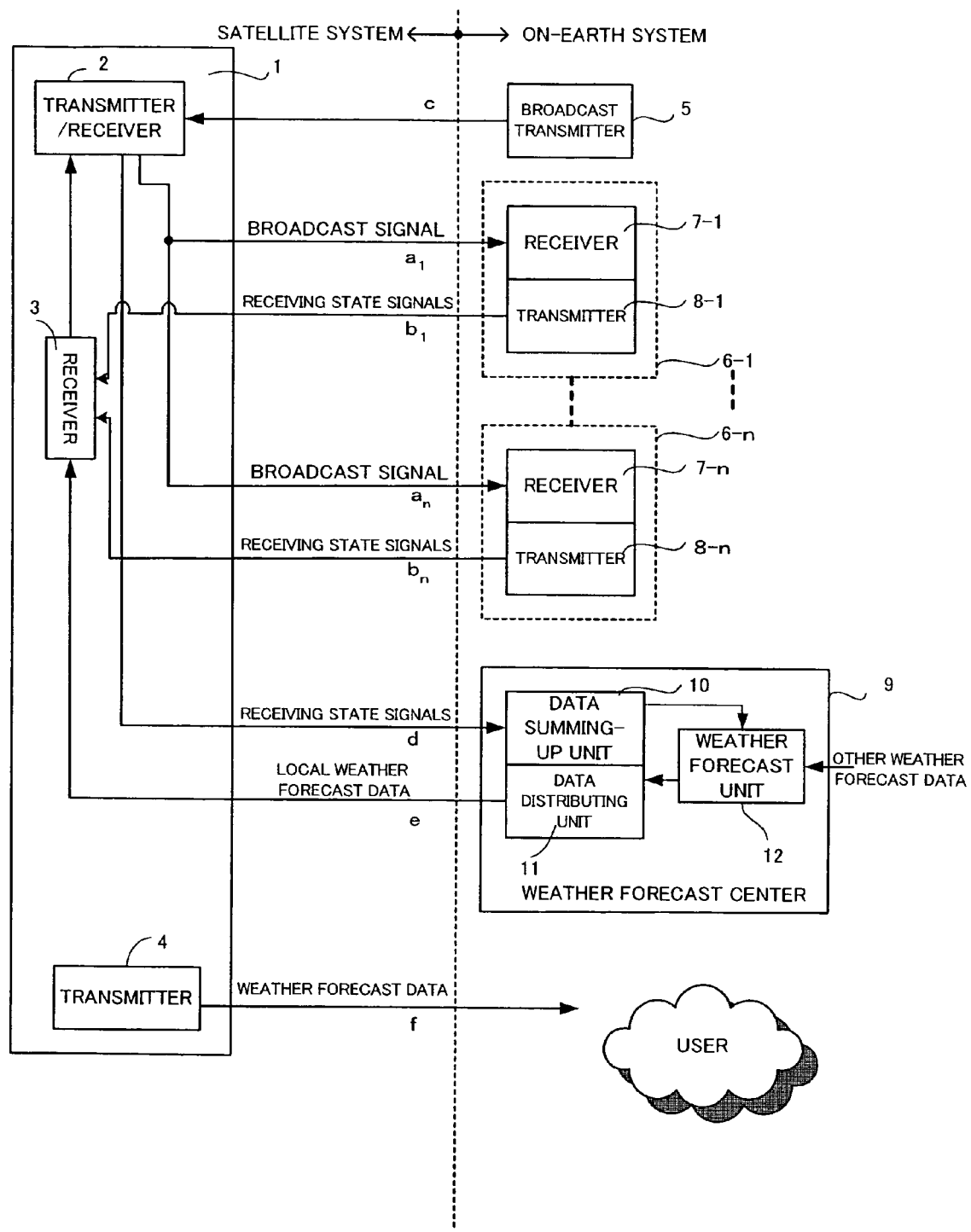
FIG. 2 is a block diagram schematically showing the arrangement of the weather forecast data distributing system shown in FIG. 1.

An embodiment of the present invention will now be described as Embodiment 1" with reference to FIGS. 1 and 2. In this embodiment, the weather forecast data distributing function according to the present invention is provided in a broadcast satellite service, in which the full area of our country is the data-receiving area. FIG. 1 is a view for describing the basic operation of "Embodiment 1" of the weather forecast data distributing system according to the present invention. FIG. 2 is a block diagram schematically showing the arrangement of the weather forecast data distributing system shown in FIG. 1.

Referring to FIG. 1, a broadcast transmitter 5 for outputting a source for broadcast reception, is installed on the earth, and transmits a broadcast signal constituted by a GHz or like band high frequency signal toward an artificial satellite 1. A transmitter/receiver 2 provided in the artificial satellite 1 receives this signal (i.e., radiowave), and executes a predetermined signal conversion. The transmitter/receiver 2 then transmits the converted signal as such transmission output as to reach the full area of our country as radio wave. In FIG. 1, the transmission signal is shown dividedly as broadcast signals $a_1$ to an for the sake of the brevity. However, the transmission signal reaches the full area of our country continuously as radio wave.

On the earth, a plurality of (i.e., n) on-earth stations 6-1 to 6-$n$ are installed in substantially uniform distribution in our country. One such on-earth station (6-1, for instance) has a receiver 7-1 and a transmitter 8-1. The receiver 7-1 receives the broadcast signal $a_1$ transmitted from the artificial satellite 1, and inputs data of the reception level to the transmitter 8-1. The transmitter 8-1 transmits a receiving state signal $b_1$ toward the artificial satellite 1.

As the broadcast signal $a_1$ travels from the artificial satellite 1 to the on-earth station 6-1, its radio wave attenuation undergoes variations in dependence on whether it is cloudy, the density of cloud, whether it rains or snows and other factors. Thus, this data and the position data of the on-earth station (i.e., address signals specifying a plurality of on-earth stations) are added to the receiving state signal $b_1$ transmitted to the artificial satellite 1.

Likewise, in the on-earth station 6-2 located next to the on-earth station 6-1, as the broadcast signal $a_2$ travels from the artificial satellite 1 to the on-earth station 6-2, its radio wave attenuation undergoes variations in dependence on whether it is cloudy, the density of cloud, whether it rains or snows and other factors. Again this data and the position data of the on-earth station 6-2 are added to the receiving state signal $b_2$ transmitted to the artificial satellite 1.

Likewise, the on-earth stations up to the station 6-$n$ transmit the receiving state signals up to the signal $b_n$, respectively, to the artificial satellite 1.

While the broadcast signals $a_1$ to $a_n$ are alike as output signal, the receiving state signals $b_1$ to $b_n$ undergo variations in dependence on the weather condition, whether it is cloudy, the density of cloud, etc. These changes lead to weather condition changes, and these data are used as basic data for the weather forecast analysis to be described later.

The receiving state signals $b_1$ to $b_n$ are received in a receiver 3 provided in the artificial satellite 1 and inputted to the transmitter/receiver 2 therein to be transmitted as receiving state data d for analysis to a weather forecast center 9.

The weather forecast center 9 is installed substantially at the center of the broadcast receiving area as on-earth system, and it includes a data summing-up unit 10 for summing up the receiving state signal d for analysis at every predetermined summing-up time, a weather forecast unit 12 for executing analysis for weather forecast by using the summed-up data as basic data and a data distributing unit 11 for transmitting weather forecast data e, which relates to the distribution of weather forecast data obtained in the weather forecast unit 12, toward the artificial satellite 12.

In the weather forecast based on the analysis executed in the weather forecast unit 12 provided in the weather forecast center 9, the cloud quantity, for instance, is converted to one of three observation data levels (i.e., fine, slightly cloudy and cloudy). Where the cloud quantity in a pertinent area is expressed as image density of 256 gradations, a decision that "it is cloudy" is made when the area occupation factor of areas with density values of 5 is more is 30% or more, a decision that "it is slightly cloudy" is made when the area occupation factor is less than 30% and more than 5%, and a decision that "it is fine" is made when the area occupation factor is less than 5%.

Then, pertinent candidate data is extracted from past statistical data retrieved earlier, and time-series data close to these cloud levels of the pertinent day is further selected as preliminary forecast data.

The weather forecast unit 12 can also input, as desired, other data for the weather forecast, for instance, data of the temperature and the relative humidity in the site of installation of the weather forecast center 9, or data of the temperature and the relative humidity at the sites of the on-earth stations 6-1 to 6-$n$, and do weather forecast by taking these data into considerations.

The data of the temperature and the relative humidity in each site may be outputted to the side of the artificial satellite in the state that they are added to the cloud and other basic data contained in the receiving state signals $b_1$ to $b_n$ from the on-earth stations 6-1 to 6-$n$.

The weather forecast data e received in the receiver 3 in the artificial satellite 1 is subjected to a predetermined signal conversion and then inputted a transmitter 4, from which weather forecast data f constituted by a GHz band high frequency signal is transmitted toward the earth and distributed to the users. While the transmitter 4 is provided independently in the artificial satellite 1 for the weather forecast data output, instead it is also possible to let its function to be provided in the transmitter/receiver 2 for transmitting the broadcast reception data.

Figure 3:
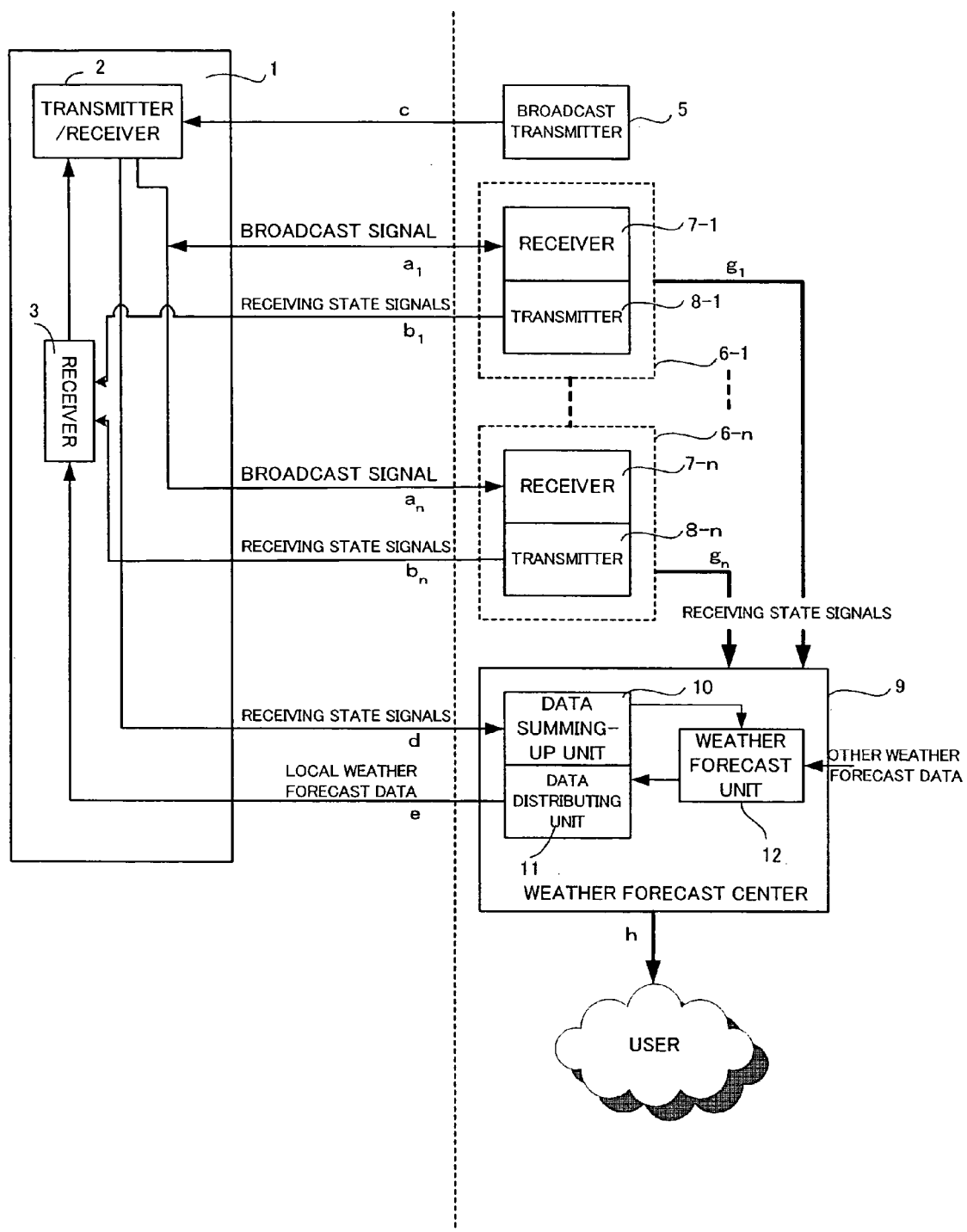
FIG. 3 is a block diagram schematically showing the arrangement of the weather forecast data distributing system according to another embodiment of the present invention.

In the "Embodiment 1" described so far, data for obtaining the weather forecast data e are all transmitted as radio wave from the on-earth system to the satellite system and then transmitted as receiving state signal d for analysis back from the satellite system to the data summing-up unit 10 of the weather forecast center 9 on the on-earth system, and the weather forecast data e is obtained on the basis of the receiving state signal d for analysis. Alternatively, as in "Embodiment 2" shown in FIG. 3, additional data $g_1$ to $g_n$ may be additionally inputted from the on-earth stations 6-1 to 6-$n$, respectively, via various communication lines laid on the earth to the weather forecast center 9.

The additional data $g_1$ to $g_n$ maybe like the receiving state signals $b_1$ to $b_n$ or separate signals therefrom, for instance, data of the temperature and the elative humidity in the weather forecast center 9 or data of the temperature and the relative humidity in the on-earth stations 6-1 to 6-$n$. By inputting these data as desired, it is possible to obtain weather forecast with considerations given to these data.

Also, the data group of the receiving stage signals $b_1$ to $b_n$ and the data group of the additional data $g_1$ to $g_n$ may partly overlap each other, and it is possible to omit transmission of the receiving stage signals to the artificial satellite 1 insofar as reliable data transfer to the weather forecast center 9 via on-earth system communication means is possible.

For instance, data from on-earth stations at short distances from the weather forecast center 9 may be transferred by on-earth communication (i.e., on-earth communication of additional data $g_1$, etc.), while transferring data from distant on-earth stations by satellite communication (i.e., satellite communication of the receiving state signal $b_1$, etc.).

While in the two embodiments described above the weather forecast center installed on the earth executes the weather forecast analysis, it is also possible to provide this function on the side of the artificial satellite or on both sides of the weather forecast center and the artificial satellite.

The subject area according to the present invention is not limited only to the full area of our country, but it may also be a narrower area, for instance Kantoh area (around Tokyo area), or conversely a wider area, for instance Asian area.

Moreover, the artificial satellite maybe an existing broadcast satellite. While the broadcast status is the reception of image and voice, the present invention is also applicable to the case of the sole image or voice or the case of personal computer. Furthermore, the present invention is effectively applicable to a communication satellite, which is not a broadcast satellite but provided for voice communication or communication of letters and photographs.

In the above embodiments, the artificial satellite is obviously not only so-called still satellite moving in synchronism to the spinning of the earth but may also be an asynchronously moving artificial satellite (i.e., orbit satellite) by increasing the number of utilized artificial satellite.

With the weather forecast data distributing system according to the present invention, it is possible to obtain desired weather forecast by deftly utilizing on-earth terminals for an existing broadcast/communication system, which is available for a separate purpose from the weather forecast. This permits extremely reducing the cost of the entire system, and is very advantageous from the standpoint of cost.

Also, broadcast/communication terminals, which are provided for a separate purpose from the weather forecast, permit easily realizing wide-scope development of local weather forecasts by disposing them in a very wide area.

Furthermore, by reflecting the local weather data (including trends) as additional data on full-area weather forecast, it is possible to expect accuracy improvement of the full-area weather forecast.

Thus, according to the present invention it is possible to provide a weather forecast data distributing system, which permits performing the wide-area-wise weather forecast with a simple system arrangement and also permits local weather forecasts at low cost.

Changes in construction will occur to those skilled in the art and various apparently different modifications and embodiments maybe made without departing from the scope of the present invention. The matter set forth in the foregoing description and accompanying drawings is offered by way of illustration only. It is therefore intended that the foregoing description be regarded as illustrative rather than limiting.

What is claimed is:

1. A method of distributing weather forecast data from an artificial broadcast or communication satellite comprising:

receiving a source signal from an on-earth transmission station;

relaying the source signal towards the earth without using any on-earth network;

receiving response signals from a plurality of on-earth receiving stations, the response signals comprising position data of the respective on-earth receiving station and an amount of attenuation caused between the artificial broadcast or communication satellite and each of the plurality of on-earth receiving stations, respectively;

transmitting the response signal from each of the plurality of on-earth receiving stations to a weather forecast center by the artificial broadcast or communication satellite;

receiving, at the artificial broadcast or communication satellite, the local and wide-area weather forecast, from the weather forecast center generated based upon the response signals from each of the plurality of on-earth receiving stations and by taking data other than receiving state data into consideration including at least one of temperature data and humidity data in an area in which a respective on-earth station is located, the at least one of temperature data and humidity data being obtained by the respective on-earth station, and distributing the local and wide-area weather forecast towards the earth from the artificial broadcast or communication satellite, and wherein on-earth stations within a predetermined distance from said weather forecast center transmit the at least one of temperature data and humidity data directly to said weather forecast center, and wherein the at least one of temperature data and humidity data is included in the response signal for on-earth stations located at a distance greater than the predetermined distance from said weather forecast center.

2. The method of distributing weather forecast data according to claim 1, further comprising:

collectively evaluating the response signals from the plurality of on-earth receiving stations to generate both a local and wide-area weather forecast.

3. The method of distributing weather forecast data according to claim 1, wherein the collectively evaluating is carried out in part by the artificial broadcast or communication satellite, and the method further comprising:

transmitting the partial evaluation to the weather forecast center; and receiving, at the artificial broadcast or communication satellite the local and wide-area weather forecast, from the weather forecast center generated based upon the response signal from each of the plurality of on-earth receiving stations , and by taking data other than receiving state data into consideration including at least one of temperature data and humidity data in an area in which a respective on-earth station is located, the at least one of temperature data and humidity data being obtained by the respective on-earth station and the partial evaluation.

4. An artificial broadcast or communication satellite for distributing weather data comprising:

a first receiver configured to receive a source signal from an on-earth transmission station;

a first transmitter configured to relay the source signal towards the earth without using any on-earth network;

a second receiver configured to receive response signals from a plurality of on-earth receiving stations, the response signals comprising at least position data of the respective on-earth receiving station and an amount of attenuation caused between the artificial broadcast or communication satellite and each of the plurality of on-earth receiving stations, respectively, wherein the first transmitter is configured to transmit the response signals from each of the plurality of on-earth receiving stations to a weather forecast center, and wherein the second receiver is further configured to receive the local and wide-area weather forecast, from the weather forecast center generated based upon the response signal from each of the plurality of on-earth receiving stations and by taking data other than receiving state data into consideration including at least one of temperature data and humidity data in an area in which a respective on-earth station is located, the at least one of temperature data and humidity data being obtained by the respective on-earth station, and wherein on-earth stations within a predetermined distance from said weather forecast center transmit the at least one of temperature data and humidity data directly to said weather forecast center, and wherein the at least one of temperature data and humidity data is included in the response signal for on-earth stations located at a distance greater than the predetermined distance from said weather forecast center.

5. The artificial broadcast or communication satellite of claim 4, further comprising:

a processor configured to evaluate, in part, the response signals from the plurality of on-earth receiving stations, wherein the first transmitter further is configured to transmit the partial evaluation to the weather forecast center.

6. A weather forecast data distributing system comprising:

a source feed transmitter configured to transmit at least one of broadcast and communication source feed;

an artificial satellite configured for at least one of broadcast and communication transmission without using any on-earth networks;

a plurality of on-earth stations provided on the earth, wherein the artificial satellite receives the transmitted at least one of broadcast and communication source feed and relays the at least one of broadcast and communication source feed towards earth as a transmission wave, a weather forecast center configured to make a local and wide-area weather forecast based on data received from the artificial satellite, wherein the artificial satellite receives the transmitted at least one of broadcast and communication source feed and relays the at least one of broadcast and communication source feed towards earth as a transmission wave, each of the plurality of on earth stations receives the transmission wave, and transmits a response signal comprising position data of the on-earth station and data indicating an amount of attenuation between the artificial satellite and each of the plurality of on-earth stations, respectively, and wherein the artificial satellite receives each of the response signals and transmits the response signal from each of the plurality of on-earth receiving stations to the weather forecast center, wherein the weather forecast center generates the local and wide-area weather forecast based upon the response signal from each of the plurality of on-earth receiving stations and by taking data other than receiving state data into consideration including at least one of temperature data and humidity data in an area in which a respective on-earth station is located, the at least one of temperature data and humidity data being obtained by the respective on-earth station and transmits the local and wide-area weather forecast to the artificial satellite, wherein the artificial satellite distributes the local and wide-area weather forecast towards the earth and wherein on-earth stations within a predetermined distance from said weather forecast center transmit the at least one of temperature data and humidity data directly to said weather forecast center, and wherein the at least one of temperature data and humidity data is included in the response signal for on-earth stations located at a distance greater than the predetermined distance from said weather forecast center.

7. The weather forecast data distributing system according to claim 6, wherein the on-earth station is an existing on-earth terminal for at least one of broadcast and communication system that is originally installed for a purpose other than weather forecast.

* * * * *